(12) United States Patent
Okada et al.

(10) Patent No.: US 7,678,303 B2
(45) Date of Patent: Mar. 16, 2010

(54) MEASUREMENT METHOD FOR INJECTION MOLDING MACHINES

(75) Inventors: Haruo Okada, Nagano-ken (JP);
Toshimi Kato, Nagano-ken (JP);
Masaki Miyazaki, Nagano-ken (JP);
Hiroo Kudo, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 882 days.

(21) Appl. No.: 11/441,163

(22) Filed: May 26, 2006

(65) Prior Publication Data

US 2006/0278014 A1    Dec. 14, 2006

(30) Foreign Application Priority Data

May 30, 2005    (JP) .............................. 2005-156843

(51) Int. Cl.
*B29C 45/52* (2006.01)

(52) U.S. Cl. ..................... 264/40.1; 264/328.1; 425/145

(58) Field of Classification Search ................ 264/40.1, 264/40.5, 40.7, 328.1, 349; 425/145–148, 425/136, 587

See application file for complete search history.

(56) References Cited

U.S. PATENT DOCUMENTS

| | | | | |
|---|---|---|---|---|
| 5,153,149 A | * | 10/1992 | Naito et al. | 425/136 |
| 5,756,037 A | * | 5/1998 | Kitamura | 264/328.1 |
| 6,113,380 A | * | 9/2000 | Hara | 425/559 |
| 6,340,439 B1 | * | 1/2002 | Hiraoka | 264/40.1 |
| 6,533,567 B2 | * | 3/2003 | Suganuma et al. | 425/145 |
| 7,074,028 B2 | * | 7/2006 | Watanabe et al. | 425/145 |
| 2006/0193943 A1 | * | 8/2006 | shiraishi et al. | 425/587 |

FOREIGN PATENT DOCUMENTS

| | | | |
|---|---|---|---|
| EP | 1439047 | * | 7/2004 |
| JP | 11-240052 A | | 9/1999 |

* cited by examiner

*Primary Examiner*—Jill L Heitbrink
(74) *Attorney, Agent, or Firm*—Birch, Stewart, Kolasch & Birch LLP

(57) ABSTRACT

A measurement method including a main measurement process Sa in which measurement is performed by rotating a screw in the forward direction with a back-flow prevention valve installed on its tip and a post-measurement process Sb which is performed by rotating the screw in a reverse direction after the main measurement process Sa is finished, the post-measurement process Sb being performed after completing the main measurement process Sa, in which the screw is moved forward in a free rotational state, the rotational state of the screw during the forward movement being monitored, and if the rotation of screw comes to a halt, the screw is rotated in a reverse direction by a specified amount of rotation.

13 Claims, 6 Drawing Sheets

| ITEM / RING VALVE FORCED CLOSING | YES | NO |
|---|---|---|
| AVERAGE VALUE[g] | 4.534 | 4.559 |
| STANDARD DEVIATION | 0.0018 | 0.0074 |
| MAXIMUM VALUE[g] | 4.539 | 4.578 |
| MINIMUM VALUE[g] | 4.530 | 4.544 |
| RANGE[g] | 0.0087 | 0.0339 |
| 6CV | 0.24 | 0.98 |

6CV[%] = (STANDARD DEVIATION/AVERAGE VALUE)×6×100

MEASUREMENT METHOD FOR INJECTION MOLDING MACHINES

BACKGROUND OF THE INVENTION

1. Field of the Invention

The present invention relates to measurement method for injection molding machines in which measurement is performed by rotating a screw with an installed back-flow valve, and the back-flow prevention valve is forcibly closed.

2. Description of the Relevant Art

In general, in inline screw type injection molding machines, back-flow of molten resin during injection is prevented by installing a back-flow prevention valve (ring valve) on the tip of a screw. In this kind of injection molding machine, measurement method is conventionally performed in order to provide more reliable back-flow prevention, in which the back-flow prevention valve is forcibly closed by rotating the screw in reverse by a small number of rotations (rotation angle), after performing measurement by rotating the screw (with forward rotation).

For example, disclosed in Japanese Unexamined Patent Publication No. 11 (1999)-240052 is an operation method (measurement method) of an inline type injection molding machine in which the amount of measured molten mixed resin to be injected is prevented from changing during suck-back and injection, reducing dispersion in the amount of fill. In this operation method, after measuring molten mixed resin pooled in the tip of a heating tube, a screw is rotated and a check ring (ring valve) is moved until it makes contact with a check sheet to close a resin path formed between the check ring and the check sheet, and then suck-back processing is performed.

However, the following problems exist in the conventional operation method (measurement method) of injection molding machines.

First, because the reverse rotation of the screw is controlled by a set time or amount of screw rotation, dispersion easily occurs in the position of the back-flow prevention valve (ring valve) or resin pressure after reverse rotation. Finally, it becomes insufficient to prevent variation in the amount of measured resin between shots, making it impossible to secure high measurement accuracy.

Second, because the screw is rotated in reverse after measurement is over when resin pressure in the rear of the back-flow prevention valve becomes higher than in the front, it is difficult for the back-flow prevention valve to move backward (closing direction), making it impossible to close the back-flow prevention valve fully. Even if suck-back processing which makes the screw retreat is subsequently performed, the closed back-flow prevention valve may open again, making it impossible to close the back-flow prevention valve securely and stably before starting injection.

SUMMARY OF THE INVENTION

The objective of the present invention is to provide measurement method for injection molding machines in which high measurement accuracy can be secured by significantly reducing the dispersion of the resin pressure after reverse rotation, and further, variation in the amount of measured resin between shots even when measurement is performed by rotating forward a screw with a back-flow prevention valve installed on its tip and then rotating the screw in reverse.

Another objective of the present invention is to provide a measurement method for injection molding machines in which the problem of a back-flow prevention valve reopening by suck-back processing is eliminated, and the back-flow prevention valve can be closed securely and stably before starting injection, even when suck-back processing is included after rotating a screw in reverse.

In order to achieve this objective, the measurement method for injection molding machines of the present invention is characterized by means of the fact that, in a measurement process comprising a main measurement process where measurement is performed by rotating forward a screw with a back-flow prevention valve installed on its tip and a post-measurement process where the screw is rotated in reverse to perform post-measurement processing after the main measurement process is finished, post-measurement processing is performed in which the screw is put into a free-rotation state and moved forward after the main measurement process is finished, the rotation state of the screw during forward movement is monitored, and if the screw rotation comes to a halt, it is rotated in reverse by a specified amount of rotation.

DETAILED DESCRIPTION OF THE PREFERRED EMBODIMENT

A preferred embodiment of the present invention is explained in detail hereafter, with reference to the drawings. The attached drawings are not for specifying the present invention but for making it easier to understand. In order to avoid ambiguity of the present invention, detailed explanations are omitted for commonly-known parts.

Figure 3:
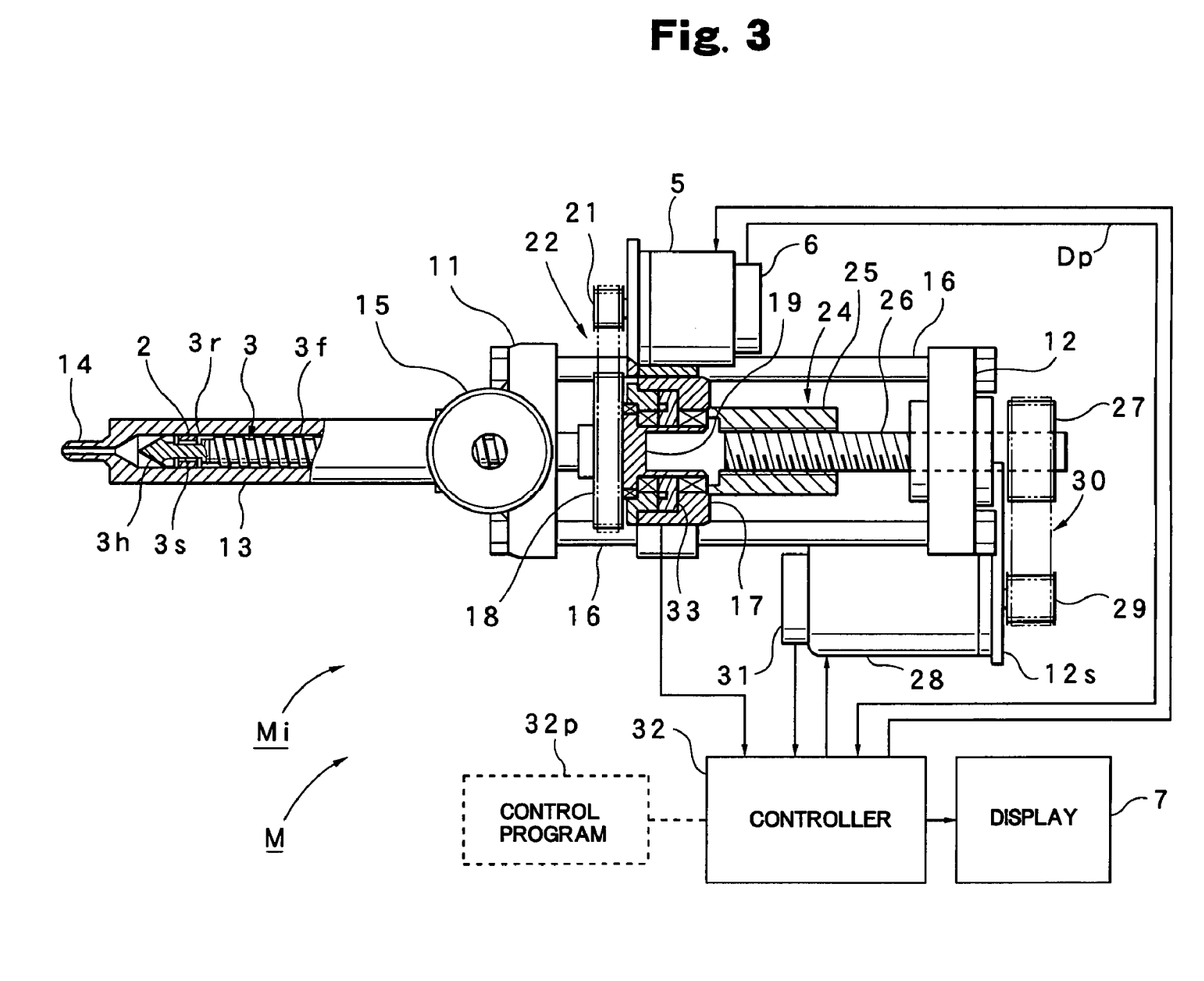
FIG. 3: A partial cross-sectional plane view of an injection molding machine in which the same measurement method can be embodied.
Figure 4:
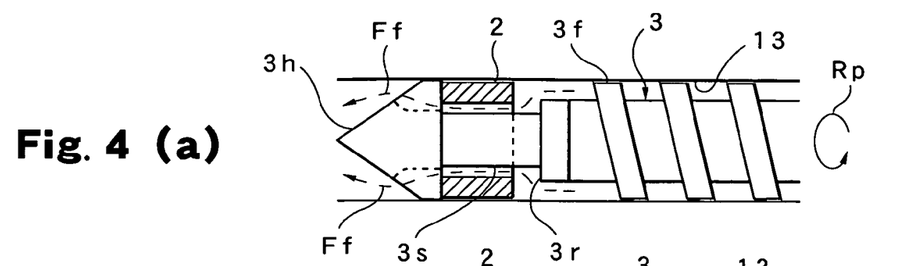
FIG. 4(a): An action explanatory drawing showing the state of the screw when performing the same measurement method.
FIG. 4(b): An action explanatory drawing showing the state of the screw after FIG. 4(a) in performing the same measurement method.
FIG. 4(c): An action explanatory drawing showing the state of the screw after FIG. 4(b) in performing the same measurement method.
FIG. 4(d): An action explanatory drawing showing the state of the screw after FIG. 4(c) in performing the same measurement method.
FIG. 4(e): An action explanatory drawing showing the state of the screw after FIG. 4(d) in performing the same measurement method.

First, the construction of an injection molding machine M which can embody the measurement method of this embodiment is explained hereafter, with reference to FIG. 3 and FIG. 4(a).

Of the injection molding machine M shown in FIG. 3, only an injection device Mi is shown without a mold locking device. The injection device Mi is equipped with an injection stage 11 and a driving stage 12 which are apart from each other, and the rear end of a heat sleeve 13 is supported by means of the front face of this injection stage 11. The heat sleeve 13 is equipped with an injection nozzle 14 at its front end and a hopper 15 at its rear, which supplies molding material into the heat sleeve 13, a screw 3 being inserted through the interior of the heat sleeve 13.

This screw 3 is equipped with a ring valve (back-flow prevention valve) 2 on its tip. As shown expanded in FIG. 4(a), the screw 3 has a cone-shape screw head 3h having a tapered tip, and has a valve loading shaft 3s having relatively a small diameter between the screw head 3h and a flight 3f, in which the ring valve 2 of a tube shape is freely displaceably loaded onto the loading shaft 3s. By this means, the ring valve 2 becomes freely slidable over a specified stroke in the axial direction of the valve loading shaft 3s (front-back direction), in which case, if the ring valve 2 retreats and makes contact with a valve sheet 3r formed in the flight 3f side, a resin path running from the flight 3f side to the screw head 3h side is blocked, and if the ring valve 2 advances and leaves the valve sheet 3r, the resin path is released. In this case, blocking the resin path is equivalent to closing the ring valve 2.

On the other hand, four tie bars 16 . . . are installed between the injection stage 11 and the driving stage 12, and a sliding block 17 is freely slidably loaded to the tie bars 16 . . . . At the front end of the sliding block 17, a rotary block 19 having a moving ring 18 in one unit is supported to be freely rotatable, the rear end of the screw 3 being connected to the center of the rotary block 19. Also, a servo motor 5 for screw rotation (electric motor) is attached to the side of the sliding block 17, and a driving ring 21 fixed to the rotation shaft of the servo motor 5 is connected to the moving ring 18 via a rotation transmission mechanism 22. The rotation transmission mechanism 22 may be either a gear-type transmission mechanism utilizing a transmission gear or a belt-type transmission mechanism utilizing a timing belt. Furthermore, installed with the servo motor 5 is a rotary encoder 6 which detects the rotation speed (number of rotation) of the servo motor 5.

On the other hand, on the rear of the sliding block 17, a nut unit 25 is coaxially installed in one unit, the front side of a ball screw unit 26 supported to be freely rotatable on the driving stage 12 is fit into the nut unit 25, constructing a ball screw mechanism 24. Also, a moving ring 27 is attached to the rear end of the ball screw unit 26 projecting rearward from the driving stage 12, a servo motor (electric motor) 28 for screw advancement/retreat is attached to a supporting panel 12s attached to the driving stage 12, and a driving ring 29 fixed to the rotation shaft of the servo motor 28 connects to the moving ring 27 via a rotation transmission mechanism 30. The rotation transmission mechanism 30 may be either a gear-type transmission mechanism utilizing a transmission gear or a belt-type transmission mechanism utilizing a timing belt. Furthermore, installed with the servo motor 28 is a rotary encoder 31 which detects the rotation speed (number of rotation) of the servo motor 28.

Also, in FIG. 3, indicated as 32 is a controller built in the injection molding machine M, in which a control series (sequence control) can be executed in the measurement method of the embodiment by a stored control program 32p. On the other hand, connected to the controller 32 are said servo motors 5 and 28, rotary encoders 6 and 31, and a load cell (pressure detector) 33 located between the rotary block 19 and the sliding block 17. The pressure (resin pressure) applied to the screw 3 can be detected by means of the load cell 33 Furthermore, connected to the controller 32 is a display 7 utilizing a liquid crystal display, etc.

Figure 1:
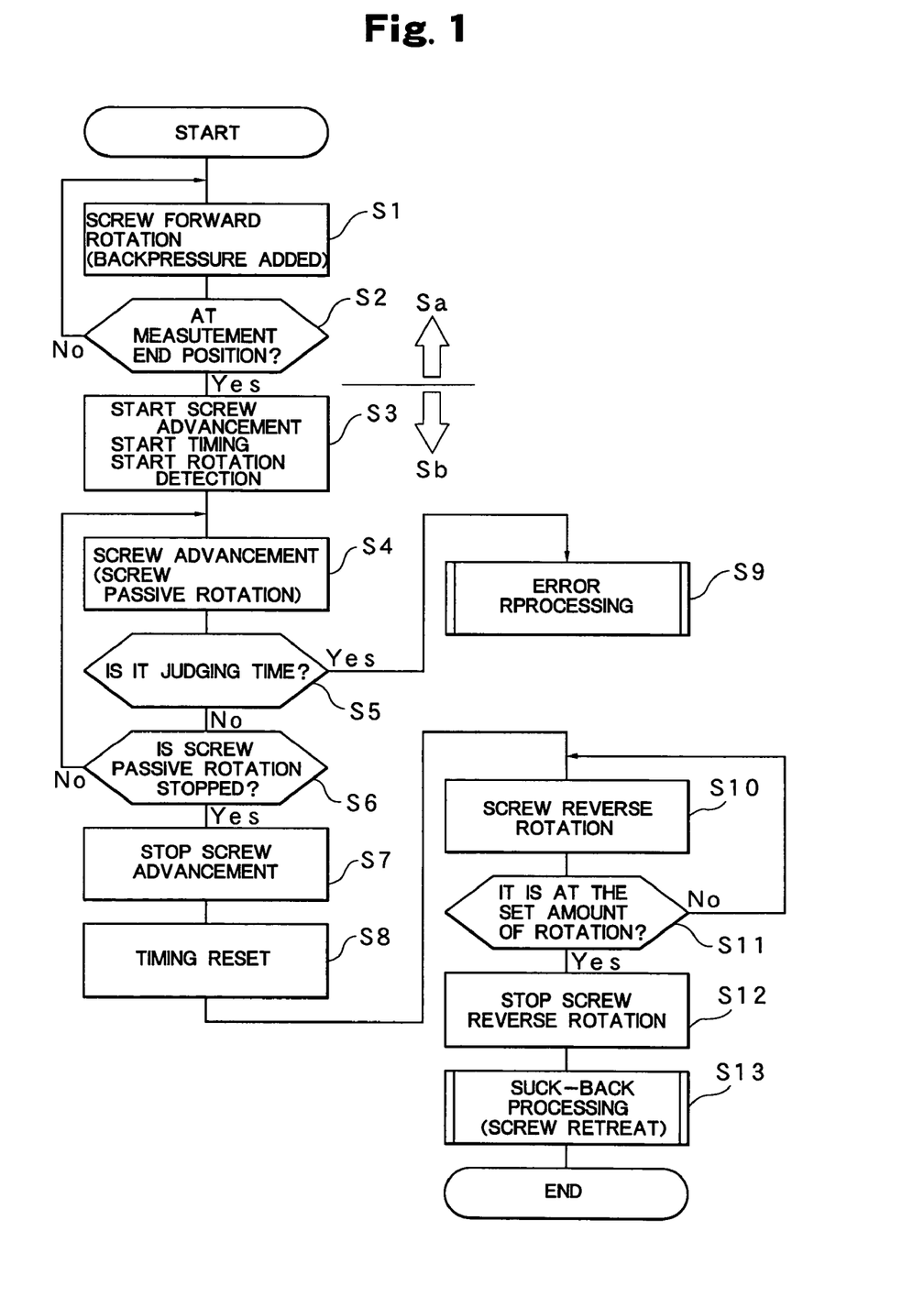
FIG. 1: A flow chart showing the processing procedure of the measurement method of injection molding machines of the most preferred embodiment of the present invention.

Next, the measurement method of this embodiment utilizing the injection molding machine M is explained with reference to a flow chart shown in FIG. 1 referring to FIGS. 3~8.

In the measurement method of the embodiment, each measurement is performed according to a main measurement process Sa and a post-measurement process Sb, and the main measurement process Sa and the post-measurement process Sb become the measurement processes.

Figure 5:
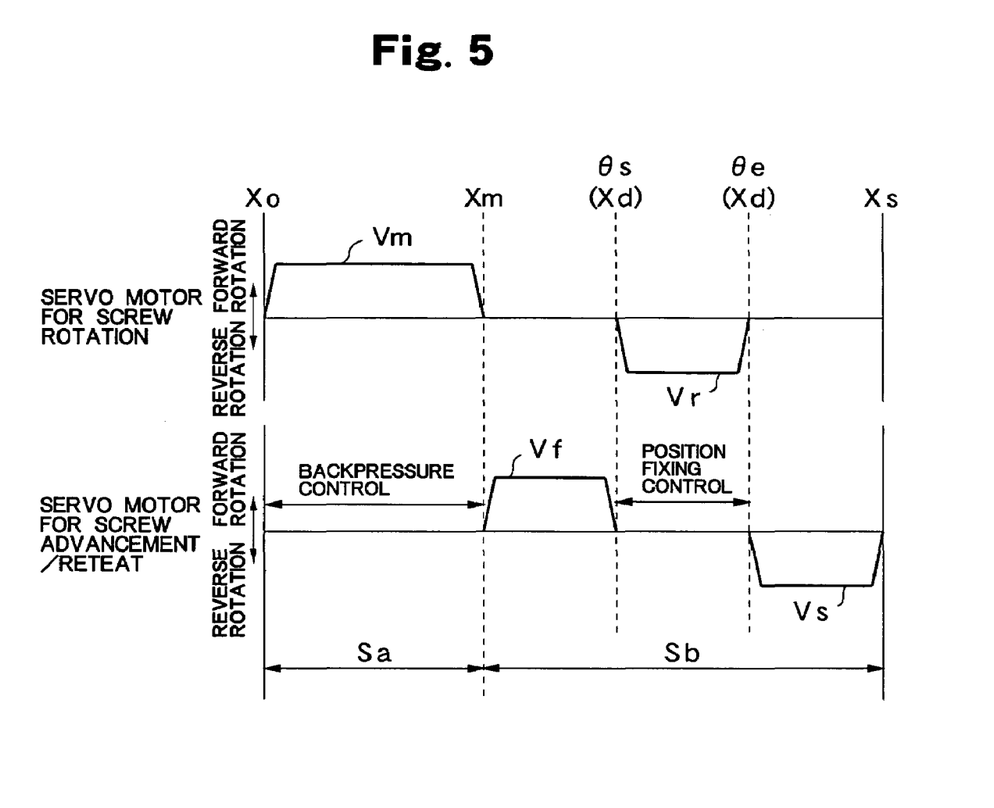
FIG. 5: A timing chart showing the action states of a servo motor for screw rotation and a servo motor for screw advancement/retreat in performing the same measurement method.

In the main measurement process Sa, first the servo motor 5 for screw rotation is drivingly controlled (speed controlled) by means of the controller 32. By this means, the rotation of the servo motor 5 is transmitted via the rotation transmission mechanism 22 to the screw 3, by means of the screw 3 rotating forward, plasticized molten resin is measured and accumulated toward the front of the screw 3 inside the heat sleeve 13, corresponding to which the screw 3 retreats (in Step S1). Also, in the main measurement process Sa, by means of the servo motor 28 to power and control the screw advancement/retreat, and the screw 3 is back-pressure controlled (in Step S1). Shown in FIG. 5 in a timing chart are operational states of the servo motor 5 for screw rotation and the servo motor 28 for screw advancement/retreat. In FIG. 5, indicated as Xo is the measurement start position, and Vm is the rotation speed of the servo motor 5 for screw rotation in the main measurement process Sa. On the other hand, shown in FIG. 4(a) is the state of the screw 3 in the main measurement process Sa, in which an arrow Rp indicates the rotation direction (forward rotation direction) of the screw 3, and an arrow Ff the relative moving direction of molten resin.

By the screw 3 retreating to a preset measurement end position Xm, the main measurement process Sa ends (in Step S2). Shown in FIG. 4(b) is a the state of the screw 3 at the measurement end position Xm. In this state, the resin pressure Pf on the flight 3f side of the ring valve 2 is in a relatively higher state than the resin pressure Ph on the nozzle head 3h side, namely a state where Ph<Pf.

Next, the explanation moves to the post-measurement process Sb. In the post-measurement process Sb, first performed is processing which moves the screw 3 to the position (contact position) where the ring valve 2 makes contact with the valve sheet 3r (in Steps S3~S9). In this case, the screw 3 is switched to a freely-rotatable state, namely a state where it can be passively rotated by an external force, and the servo motor 28 for screw advancement/retreat is drivingly controlled by the controller 32. Driving control in this case becomes a speed control with a pressure limiter added, and the rotation of the servo motor 28 is dynamically converted via the rotation transmission mechanism 30 and the ball screw mechanism 24 to move the screw 3 forward (in Steps S3 and S4). In FIG. 5, indicated as Vf is the rotation speed of the servo motor 28 for screw advancement/retreat during the forward movement of the screw 3.

Also, the controller 32 starts timing at the same time the screw 3 starts to move forward, and starts monitoring the rotation state (rotation detection) by the passive rotation of the screw 3 (in Step S3). In this case, as shown in FIG. 4(c), by the forward movement of the screw 3, molten resin in the screw head 3h side flows in reverse to the flight 3f side (arrow Fr direction), and which reverse flow the screw 3 rotates passively in the direction reverse (arrow Rrs direction) that of the forward rotation. Therefore, in this state, the resin pressure Ph in the nozzle head 3h side becomes higher than the resin pressure Pf in the flight 3f side relative to the ring valve 2, namely with a relationship where Pf<Ph.

Then, the ring valve 2 moves backward, being pushed back by the reverse flow of the molten resin, and stops at the position (contact position) making contact with the valve sheet 3r. Therefore, the ring valve 2 is effectively closed in the contact position (see the position in FIG. 4(d)). At this point in time, reverse flow of the molten resin stops, and at the same time the passive rotation of the screw 3 also stops. Because the screw 3 is accompanied by such behavior, the controller 32 monitors the rotation of the screw 3, and if the rotation of the screw 3 stops, control is immediately accomplished to stop the forward movement of the screw 3 (in Steps S5, S6, and S7).

In this case, rotation and halting of the screw 3 can be detected by monitoring an encoder pulse Dp obtained from the rotary encoder 6 installed on the servo motor 5. Specifically, if the number of pulses within a preset monitoring time becomes a specified number or if the pulse output interval becomes a specified interval (time), it is judged to be the halt state. Therefore, the halt state is a concept which includes not only a completely halted case but also a state which is slowed to a specified speed. If the halt state of the screw 3 is detected, timing is simultaneously reset (in Step S8).

By performing such screw advancement processing, the screw 3 can be always stopped precisely at the contact position where the ring valve 2 makes contact with the valve sheet 3r. By detecting such contact position (halt state) by means of the encoder pulse Dp obtained from the rotary encoder 6, no other detector is necessary, with the advantage of embodying it easily and at low cost, utilizing existing equipment.

By this means, an abnormality may possibly occur while the screw 3 is moving forward, by a part of the ring valve 2 chipping off or foreign material becoming caught in the ring valve 2. When such an abnormality occurs, the rotation of the screw 3 never stops normally but continues idly. In this embodiment, if the halt state of the screw 3 is not detected even when a preset time (judging time) Ts is reached after timing was started at the same time as the start of the forward movement of the screw 3, specified error processing is performed (in Steps S5 and S9). As the error processing, driving (operation) halt processing, alarm reporting processing, etc. can be performed, by which operation abnormality of the ring valve 2 can be quickly detected, and a measure relative to the operation abnormality can be quickly performed.

Next, processing to rotate the screw 3 in reverse is performed. Note that the reverse rotation of the screw 3 may be performed immediately after said detection of the halt state of the screw 3 or may be performed after a specified set time passed. In this case, the servo motor 5 for screw rotation is drivingly controlled (speed controlled) by means of the controller 32, by which the screw 3 actively rotates in reverse in the arrow Rr direction as shown in FIG. 4(d) (in Step S10). In FIG. 5, indicated as Vr is the rotation speed of the servo motor 5 during the reverse rotation of the screw 3, and indicated as θs and θe are angles of the screw 3. The amount of rotation of the screw 3 in reverse rotation can be set arbitrarily for each molding machine, to about ¼. In this case, (θe-θs) in FIG. 5 can be set to about 90[°]. Also, during the reverse rotation of the screw 3, the servo motor 28 for screw advancement/retreat is drivingly controlled by means of the controller 32, performing position control to fix the fore-and-aft position of the screw 3. By this, even if the screw rotates in reverse, the fore-and-aft position of the screw 3 is fixed, further preventing variation in the amount of measured resin and improving measurement accuracy. In FIG. 5, indicated as Xd is the screw position after rotating the screw 3 in reverse (reverse rotation end position).

The number of rotations (rotation angle) or the rotation speed in rotating the screw 3 in reverse can be displayed on the display 7 connected to the controller 32. By performing such a display, an operator can easily visually grasp the operational state of the ring valve 2. If the reverse rotation of the screw 3 reaches a set amount of rotation (rotation angle), control is exercised to stop the rotation of the screw 3 (in Steps S11 and S12).

During the reverse rotation of the screw 3, because the fore-and-aft position of the screw 3 is fixed, backward (arrow Fi direction) pressure is added to molten resin, as shown in FIG. 4(d). In this case, the resin pressure Ph in the nozzle head 3h side is higher than the resin pressure Pf on the flight 3f side, namely Pf<Ph, relative to the ring valve 2 and immediately before rotating the screw 3 in reverse. Therefore, after rotating the screw 3 in reverse, the resin pressure Ph in the nozzle head 3h side becomes even higher than the resin pressure Pf on the flight 3f side, namely Pf<<Ph, relative to the ring valve 2.

On the other hand, once the processing of rotating the screw 3 in reverse is complete, suck-back processing to make the screw retreat 3 by a preset stroke (about 1~2 [mm] for example) and release the pressure is performed (in Step S13). In the suck-back processing, the servo motor 28 is drivingly controlled (speed controlled) by means of the controller 32, and the screw 3 moves backward. In this case, for the backward stroke of the screw 3, the end of the backward stroke is preset as the suck-back end position Xs by considering the position where the pressure release is complete. By this, once the screw 3 reaches the suck-back end position Xs, the backward movement of the screw 3 is stopped, and suck-back processing is ended, and the process moves to the next injection processing. In FIG. 5, indicated as Vs is the rotation speed of the servo motor 28 for screw advancement/retreat and Xs is the suck-back end position in the suck-back processing, in which the suck-back end position Xs becomes the injection start position. Note that suck-back processing is processing in which the screw 3 is made to retreat by a preset slight stroke to release pressure after measurement is over, preventing the occurrences of harmful effects of resin pressure in opening the mold, namely the occurrence of such phenomena as the so-called runny nose phenomenon due to low-viscosity resin and the so-called cobwebbing phenomenon from a molding spool due to high-viscosity resin.

Shown in FIG. 4(e) is a state of the screw 3 after performing such suck-back processing, in which the resin pressure Ph in the nozzle head 3h side is somewhat higher than or about the same as the resin pressure Pf in the flight 3f side relative to the ring valve 2, namely a state where Pf<Ph or Pf≈Ph. Therefore, even if suck-back processing is performed, because the ring valve 2 can be closed with the resin pressure Ph in front (the screw head 3h side) always higher than the resin pressure Pf in the rear (the flight 3f side) of the ring valve 2 before the suck-back processing, harmful effects of the ring valve reopening by means of the subsequent suck-back processing can be eliminated, by which the back-flow prevention valve 2 can be securely and stably closed before starting injection.

On the other hand, in the controller 32, a processing is performed to correct the dispersion in the screw position further generated in the post-measurement process Sb. The processing method of this correction is explained according to a flow chart shown in FIG. 2.

Figure 2:
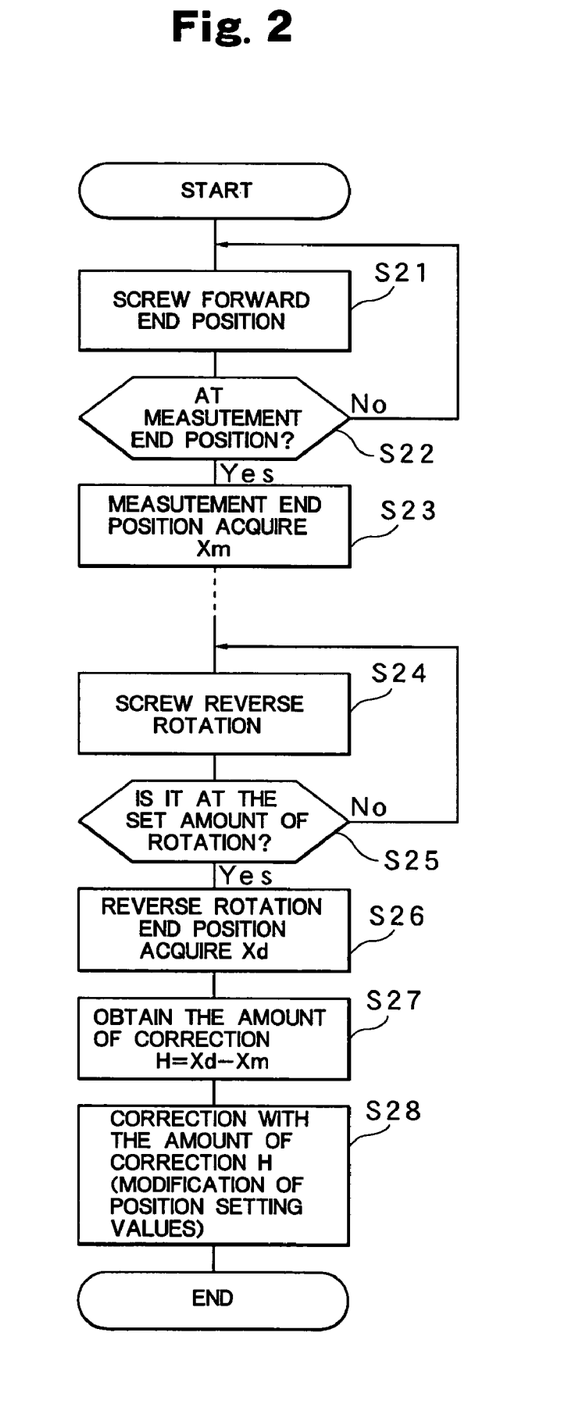
FIG. 2: A flow chart showing the processing procedure to correct dispersion in the screw position generated in post-measurement processing using the same measurement method.

First, once the main measurement process Sa is over, the measurement end position Xm which is the screw position after it is over is detected and read (in Steps S21, S22, and S23). Because the measurement end position Xm is preset in this case, the set measurement end position Xm (set value) may also be used. Also, if the screw 3 has been rotated in reverse, the reverse rotation end position Xd which is the screw position after reverse rotation is detected and read (in Steps S24, S25, and S26). In this case, the measurement end position Xm and the reverse rotation end position Xd can be detected by means of the rotary encoder 31 installed with the servo motor 28. Once the measurement end position Xm and the reverse rotation end position Xd are obtained, the amount of correction H (=Xd−Xm) is obtained from the deviation between the measurement end position Xm and the reverse rotation end position Xd. On the other hand, once the amount of correction H is obtained, position setting values X1, X2, . . . at least in the injection process are corrected with the amount of correction H (in Step S28).

Figure 6:
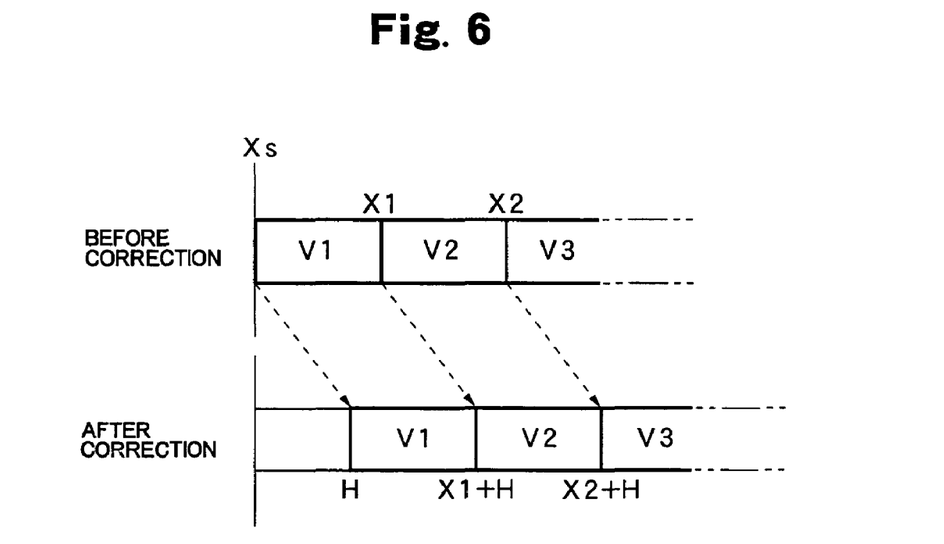
FIG. 6: An explanatory diagram for correcting dispersion in the screw position generated in the post-measurement process in the same measurement method.

Shown in FIG. 6 is a case where the position setting values X1, X2, . . . in the injection process are corrected with the obtained amount of correction H. In FIG. 6, indicated as V1, V2, V3, . . . are injection speeds set in multiple stages. As is clear from FIG. 6, when the injection process is started from the suck-back end position (injection start position) Xs of the screw 3 and the injection speed is switched from V1 to V3, in the base setting before correction, switching is performed at a setting position X1. However, if the amount of correction H is obtained and correction is made, switching is performed in the setting position (X1+H) as shown in the figure. In the same way, when the injection speed is also switched from V2 to V3, switching is performed in the setting position (X2+H). By making such a correction, the error amount of screw position occurring in the post-measurement process Sb can be eliminated, along with further variation in the amount of measured resin, and higher measurement precision can be secured.

Although shown in this example is a case where the position setting values X1, X2, . . . in the injection process are corrected by obtaining the measurement end position Xm, the reverse rotation end position Xd, and the amount of correction H, detection (operation) data of the measurement end position Xm, the reverse rotation end position Xd, the amount of correction H, etc. can also be utilized for other purposes (such as data display and analysis) by storing them.

In the injection process, the servo motor 28 is drivingly controlled by means of the controller 32. Because the rotation of the servo motor 28 is transmitted to the ball screw unit 26 via the rotation transmission mechanism 29, the ball screw unit 26 rotates forward along with the nut unit 25. As a result, the screw 3 advances, and measured molten resin is injection filled in a mold. Once the injection process is over, if the next shot (molding cycle) continues, the measurement process of the next shot is started, and the same processing relating the measurement process is performed.

Figure 7:
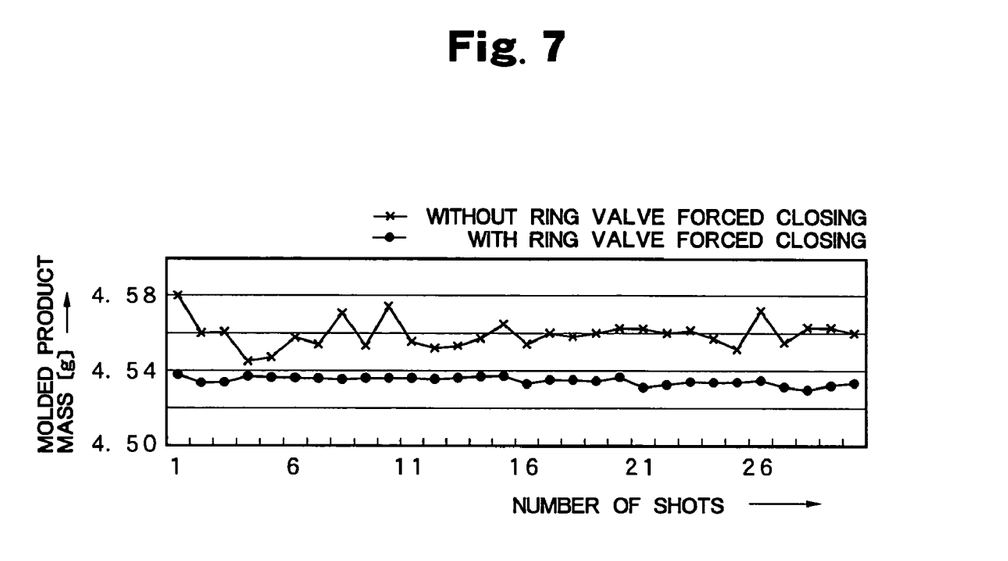
FIG. 7: A variation data plot of the mass of molded product relative to the number of shots for explaining the efficacy of the same measurement method.
Figure 8:
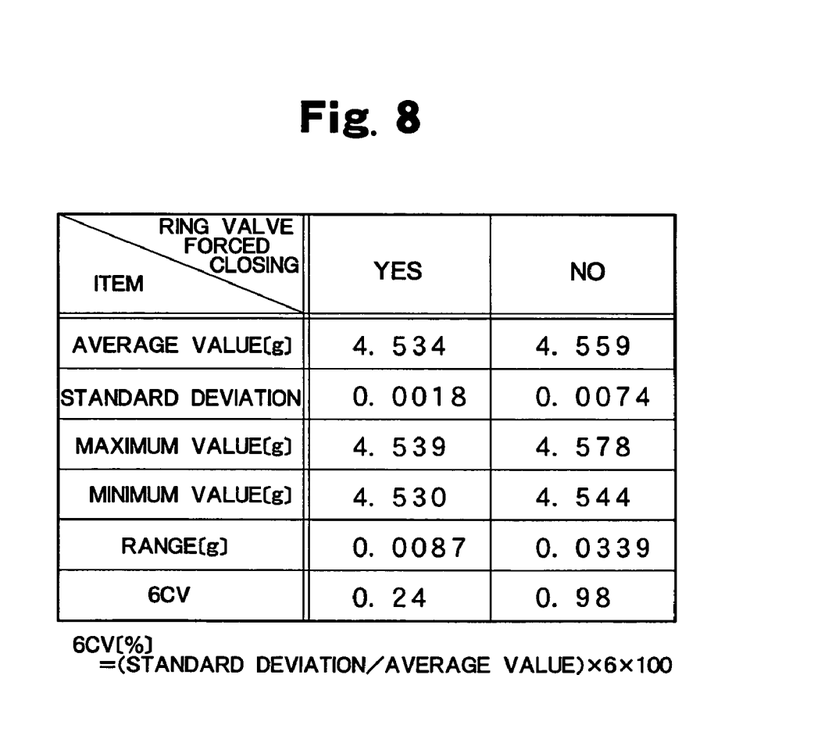
FIG. 8: A data table for explaining the efficacy of the same measurement method.

Shown in FIG. 7 and FIG. 8 is the mass [g] of actual molded product (bar flow) when measurement is performed by means of the measurement method of this embodiment. Also, listed together for comparison is the mass [g] of the actual molded product (bar flow) when measurement was not performed by the measurement method of this embodiment, namely by the measurement method used in ordinary molding. The measurement method of this embodiment indicates the case where after the main measurement process Sa is over, the screw 3 is put into the free rotation state and moved forward, the rotation state of the screw 3 during forward movement is monitored, the screw 3 is rotated in reverse by a specified amount after the rotation of the screw 3 has stopped, and further suck-back processing is performed, and that ordinary molding is the case where suck-back processing is performed immediately after the main measurement process Sa is over. As is clear from the data plot and data table shown in FIG. 7 and FIG. 8, if the ring valve is forcibly closed by the measurement method of this embodiment, the dispersion of molded product mass among shots can be greatly reduced, and 6CV which indicates the coefficient of variation could be reduced by about ⅓.

Therefore, according to the measurement method of this embodiment, the reverse rotation processing of the screw 3 in the post-measurement process Sb is started after the screw 3 is moved forward in the free rotation state, and the rotation of the screw 3 during forward movement stopped; namely the back-flow prevention valve 2 closed. Therefore, the dispersion in the resin pressure after the reverse rotation and further the variation in the amount of measured resin can be greatly reduced, by which high measurement precision can be secured, reducing the defective proportion and cutting the energy necessary for production.

Whereas an embodiment was explained in detail above, the present invention is not limited to such an embodiment, but can be arbitrarily modified and the construction details, shape, quantity, numerical value, technique, etc. can be added or omitted within a range which does not deviate from the spirit of the present invention.

For example, although a ring valve was presented as an example of the back-flow prevention valve 2, it is not limited to a ring valve. Also, although a method utilizing the encoder pulse Dp obtained from the rotary encoder 6 was shown as an example of a method for monitoring the rotational state (halt state) of the screw 3, it does not exclude other monitoring methods. Furthermore, although shown was the case in which the amount of rotation to rotate the screw 3 in reverse is set by the number of rotations (rotation angle) of the screw 3, it does not exclude the case of setting it by time. On the other hand, although an example of detecting operation abnormality by monitoring time Ts was employed, other than that, detection can be done by monitoring the number of rotation (rotation angle) of the screw 3 or the resin pressure. Therefore, in this case, if no halt state is detected even after reaching a preset number of rotation or resin pressure, a specified error processing can be performed. Also, although shown in the illustrated embodiment was a case of performing a position control in which the fore-and-aft position of the screw 3 is fixed, a pressure control with the pressure of the screw 3 fixed may be performed.

What is claimed is:

1. A measurement method for injection molding machines which comprises performing a main measurement by rotating in a forward direction a screw with a back-flow prevention valve installed on its tip and rotating said screw in a reverse direction to perform a post-measurement processing after the main measurement process is finished, wherein in said post-measurement process the screw is put in a free-rotation state and moved forward after said main measurement process is finished, the rotational state of said screw during this forward movement being monitored, so that if the rotation of said screw comes to a halt, said screw is rotated in a reverse direction by a specified amount of rotation and wherein said post-measurement process includes a suck-back processing step which moves the screw in the backward direction by a specified stroke after rotating said screw in reverse.

2. The measurement method for molding machines according to claim 1, wherein the screw position after completing said main measurement process and the screw position after rotating said screw in a reverse direction are detected, an amount of correction is obtained from the deviation between said measurement end position and said reverse rotation end position, and the position setting values in at least the injection process are corrected with this amount of correction.

3. The measurement method for molding machines according to claim 1, wherein said halt state is detected by an encoder pulse obtained from a rotary encoder installed with a servo motor for screw rotation which rotates said screw.

4. The measurement method for molding machines according to claim 1, wherein if said halt state is not detected, even when a preset time is reached while monitoring said screw rotation state, specified error processing is performed.

5. The measurement method for molding machines according to claim 1, wherein if said halt state is not detected, even when a preset number of rotations is reached while monitoring said screw rotation state, specified error processing is performed.

6. The measurement method for molding machines according to claim 1, wherein if said halt state is not detected, even when a preset resin pressure is reached while monitoring said screw rotation state, specified error processing is performed.

7. The measurement method for molding machines according to claim 1, wherein when rotating said screw in reverse, control is exercised to fix the fore-and-aft position of said screw.

8. The measurement method for molding machines according to claim 1, wherein when rotating said screw in reverse, control is exercised to fix the pressure of said screw.

9. The measurement method for molding machines according to claim 1, wherein the amount of rotation to rotate said screw in reverse is preset according to the number of rotations of said screw.

10. The measurement method for molding machines according to claim 1, wherein the number of rotations in rotating said screw in reverse is shown on a display.

11. The measurement method for molding machines according to claim 1, wherein the amount of rotation in rotating said screw in reverse is preset according to time.

12. The measurement method for molding machines according to claim 1, wherein the rotation speed in rotating said screw in reverse is shown on a display.

13. The measurement method for molding machines according to claim 9, wherein the number of rotations in rotating said screw in reverse is shown on a display.

* * * * *